F. W. LOVELADY & B. J. KENNEDY.
CANDY MACHINE.
APPLICATION FILED MAY 26, 1910.
1,002,411.
Patented Sept. 5, 1911.
5 SHEETS—SHEET 1.
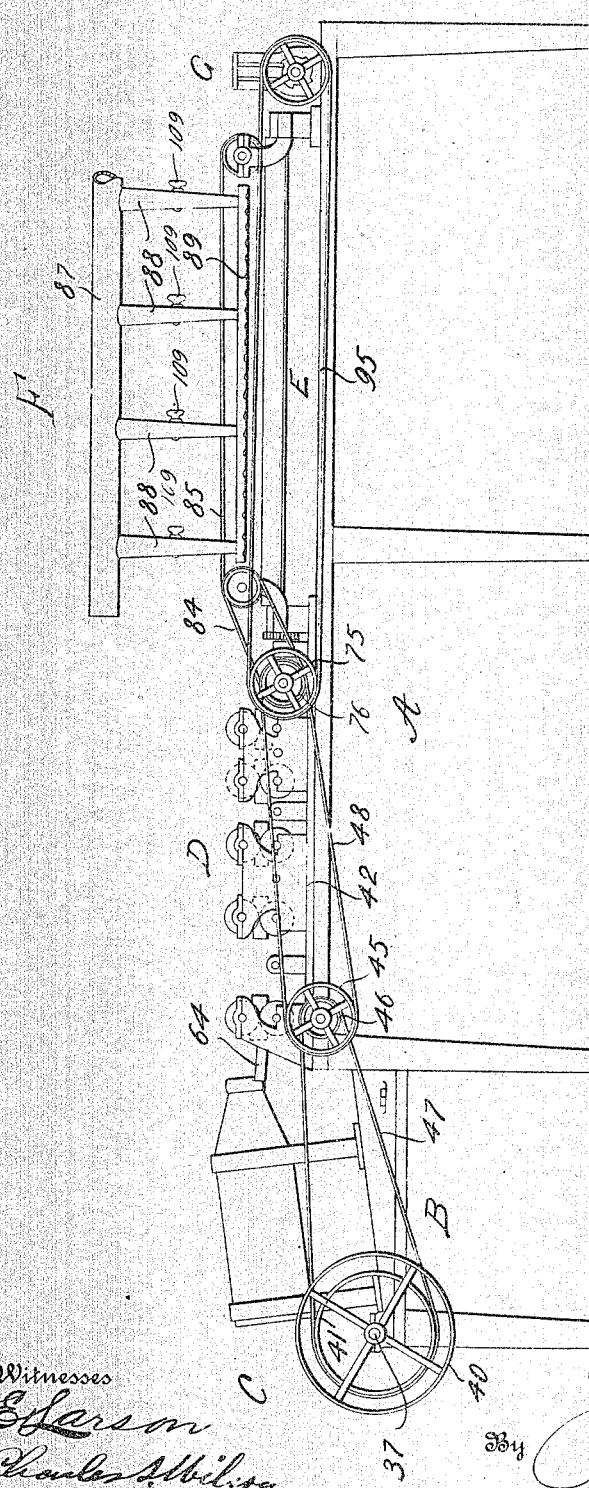
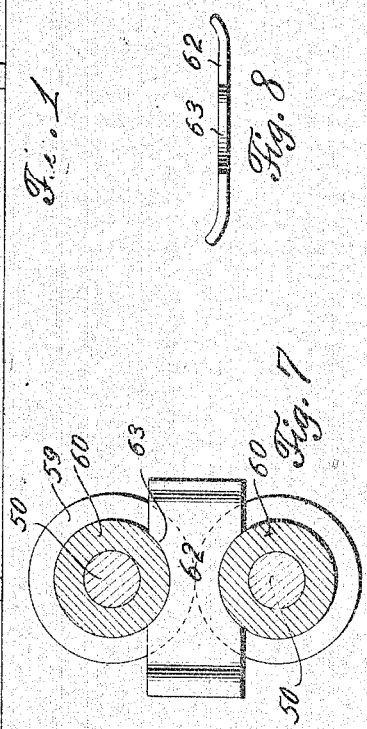
Witnesses
E. Larson
Charles A. Wilson
Inventors
F. W. Lovelady
B. J. Kennedy
By Bellord Cobb
Attorneys

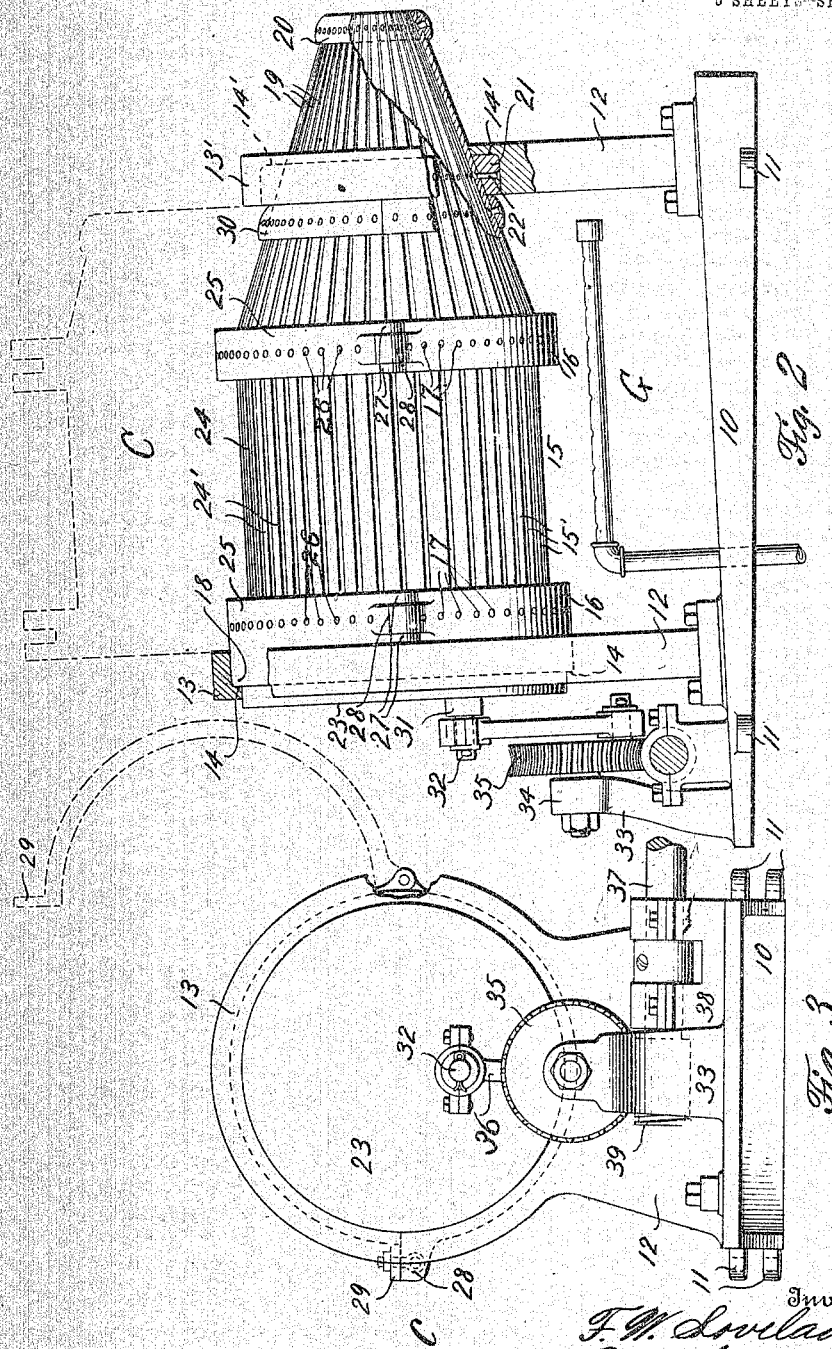

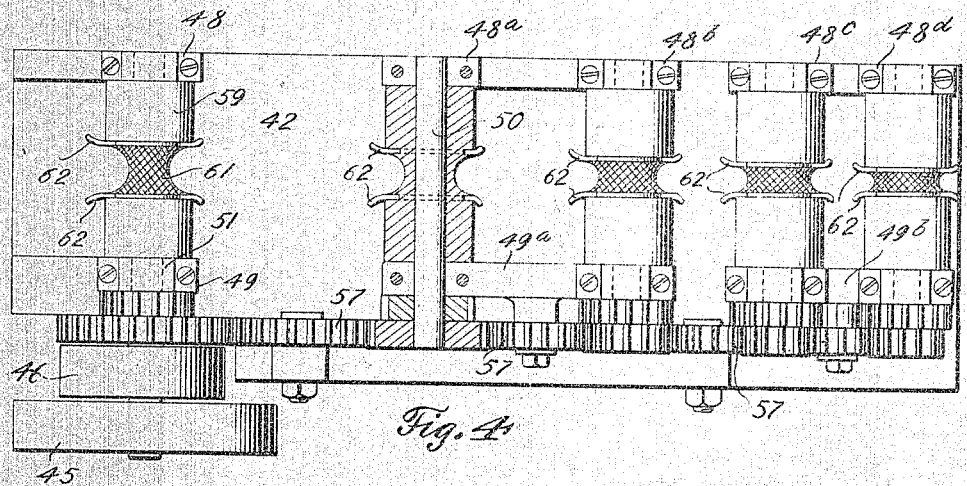
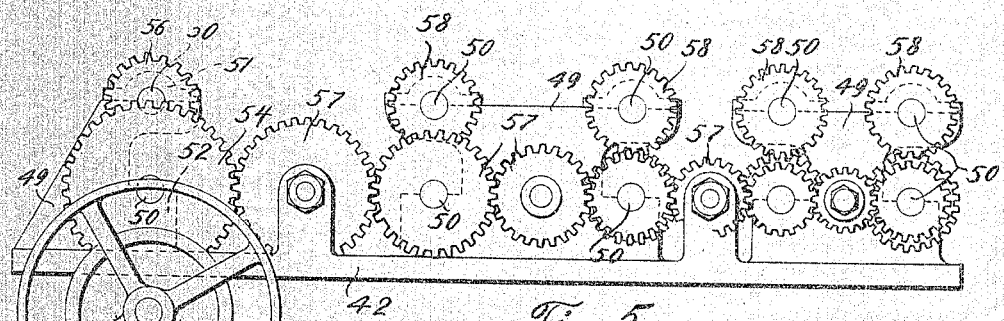
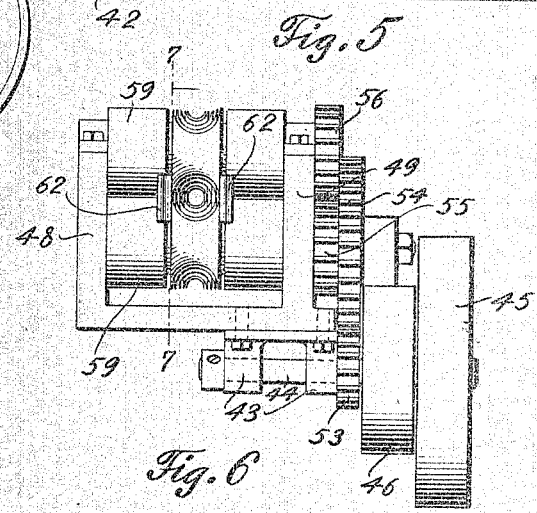

F. W. LOVELADY & B. J. KENNEDY.
CANDY MACHINE.
APPLICATION FILED MAY 26, 1910.

1,002,411.

Patented Sept. 5, 1911.

5 SHEETS—SHEET 4.

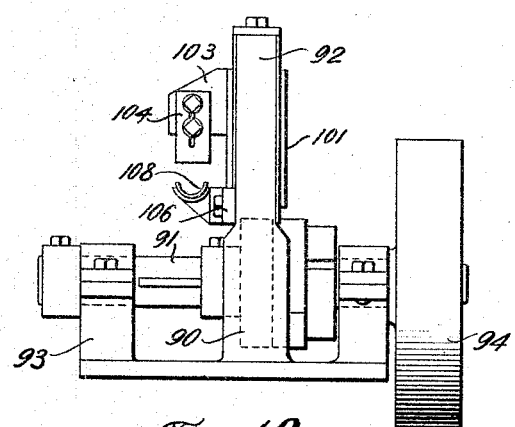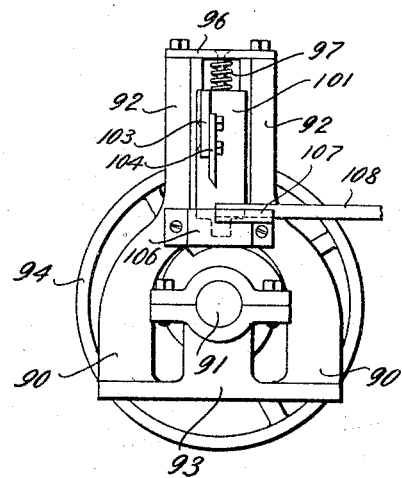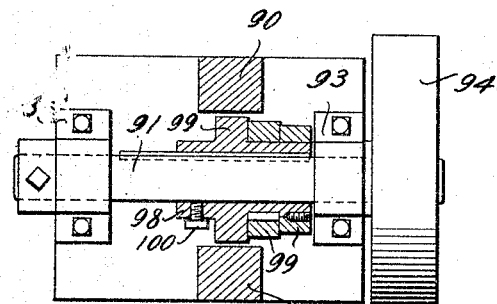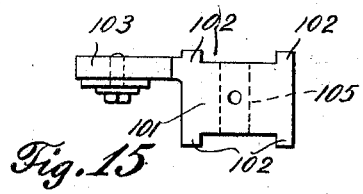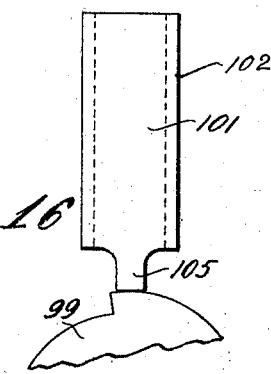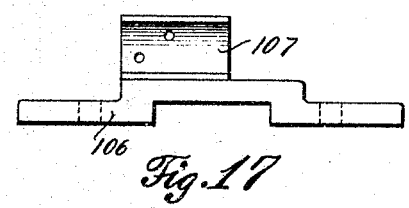

UNITED STATES PATENT OFFICE.

FREDRICK W. LOVELADY AND BERNARD J. KENNEDY, OF SAGINAW, MICHIGAN.

CANDY-MACHINE.

1,002,411.

Specification of Letters Patent. Patented Sept. 5, 1911.

Application filed May 26, 1910. Serial No. 563,645.

*To all whom it may concern:*

Be it known that we, FREDRICK W. LOVELADY and BERNARD J. KENNEDY, citizens of the United States, residing at Saginaw, in the county of Sanginaw and State of Michigan, have invented certain new and useful Improvements in Candy-Machines, of which the following is a specification.

This invention relates to candy machines, and is designed to construct a machine which will be provided with a batch feeder, reducing rollers, twisting rollers, a cooling device, and an adjustable cutter, all of the parts of the machine being adapted to coöperate and receive candy directly from the machine performing the preceding process.

This invention also contemplates the combining into one machine the various machines which have heretofore been necessary in the manufacture of stick candy, thus eliminating the necessity of touching the candy in any manner until the finished product is delivered from the cutter.

A further object is to provide a cutter which will be readily adjustable for the purpose of cutting candy in different lengths in proportion to the diameter of the candy produced by the producing rollers as sixteen sticks to the pound and twenty sticks to the pound, etc.

With the above and other objects in view, this invention consists in the combination, arrangement, and construction of parts, all as hereinafter more fully described, claimed, and illustrated in the accompanying drawings, wherein—

Figure 9:
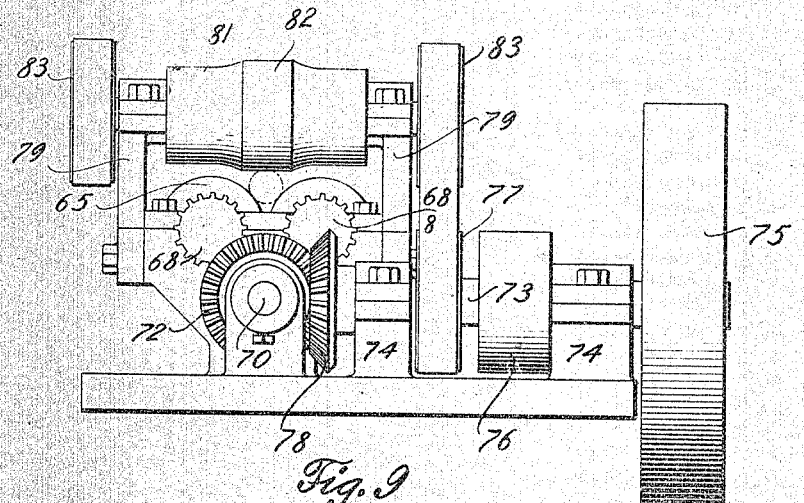
Figure 10:
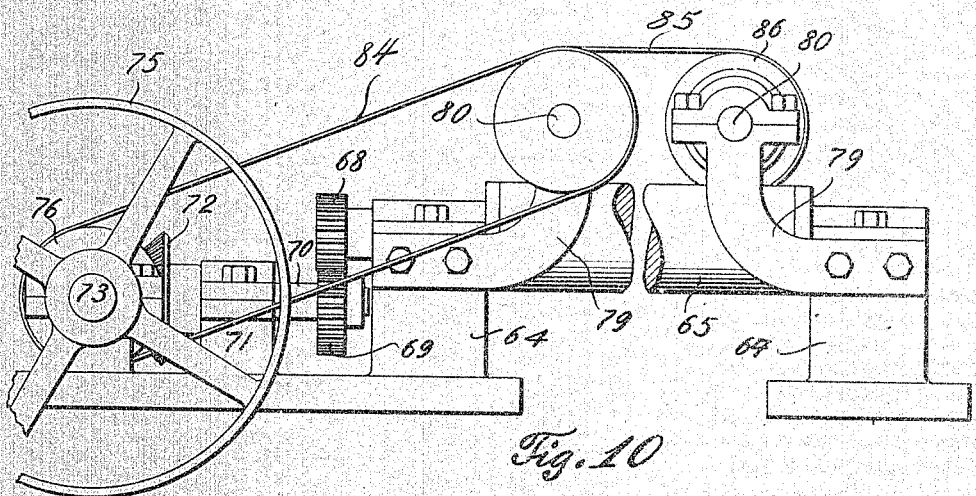
Figure 11:
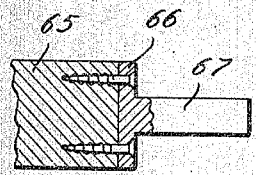

Figure 1 is a diagrammatic side elevation of the present invention illustrating the coöperation between the various elements thereof; Fig. 2 is a side elevation partly in section of the batch feeder; Fig. 3 is a rear end elevation; Fig. 4 is a top plan view of the reducing rollers, illustrating one of said rollers in section; Fig. 5 is a side elevation thereof; Fig. 6 is a rear end elevation; Fig. 7 is a section taken along the line 7—7 of Fig. 6; Fig. 8 is a detail view of one of the guiding and reducing plates; Fig. 9 is a rear end elevation of the twisting rollers; Fig. 10 is a side elevation thereof; Fig. 11 is a fragmentary view partly in section illustrating the mounting of the twisting rollers; Fig. 12 is a rear end elevation of one of the cutting plates; Fig. 13 is a side elevation thereof; Fig. 14 is a top plan view partly in section of the cutting mechanism; Fig. 15 is a top plan view of the knife carrying slide; Fig. 16 is a side elevation thereof illustrating the coöperation with the operating disks; Fig. 17 is the bracket carrying the delivery and receiving chute.

The present invention resides in the provision of a supporting table, said table carrying a batch feeder which is adapted to deliver the material directly to the feed rollers which in turn deliver it directly to the twisting and cooling devices after which the candy is cut into various lengths according to the number of sticks to the pound. All of these machines are driven indirectly from the batch feeder and in proportion to the speed with which the candy is delivered. The reducing rollers are adjustable to various shapes and sizes of candy, the cutting device being also adjustable in proportion to the size of candy delivered by the reducing rollers.

Reference being had more particularly to the accompanying drawings A designates the main table of the machine, said main table having at one terminal thereof the auxiliary table B. A batch feeder indicated in general as C is carried by the auxiliary table B, and is adapted to deliver the candy directly to the reducing rollers designated generally as D which is located on the main table adjacent to the batch feeder, said reducing rollers coöperating with the twisting rollers E over which operates the cooling blast mechanism F. A cutting device G is carried at the extreme end of the table A and is adapted to receive the candy from the twisting rollers after the same has been approximately completely cooled.

Referring to Figs. 2 and 3 in which are set forth the details of the batch feeder, 10 indicates the base plate thereof, said base plate being provided with the orificed lugs 11 through the instrumentality of which the same is secured to the table B. This plate slopes from the forward end thereof to the rear end and carries the brackets 12 adjacent each extremity thereof, said brackets being provided with the circular supporting portions 13 and 13', which are provided with the shoulders 14 and 14' about their outer edges. The batch feeder is constructed in two sections and is rotatably mounted in the brackets or supports 13 and 13'. The lower section 15 extends through both the brackets and is constructed of a plurality of strips 15', said strips being approximately horizontal adjacent to the support 13 and are bent upwardly to pass through the support 14′. These strips are provided with the semi-circular bands 16, said bands being provided with the bolts or rivets 17 which supply means whereby the strips may be secured to the bands. Adjacent to the support 13 the lower section 15 of the batch feeder extends into said support and entirely around the same and is provided with a shoulder 18 which is adapted to bear against the shoulder 14 of the support. A series of short strips 19 are mounted in the upper half of the bracket 13′ and form in combination with the portion of the strips 15′ of the stationary section 15 which protrude through the bracket 13 a funnel shaped member or delivery opening, the terminals of said strips being connected by the clamping band 20. The bent portion of the strips 15 in combination with the short strips 19 form a funnel-shaped delivery spout for the batch feeder. A clamping band 21 is mounted in the opening of the supporting member 13′ and is provided with a plurality of rivets 22, it encircles and engages the strips forming the delivery spout, thus forming a secure and firm structure. As the rear terminal of the batch feeder is closed by the plate 23 a hinged portion 24 is provided between the supporting members 13 and 13′ which supply means whereby the material may be placed within the feeder. This hinged member 24 is constructed of the strips 24′ which are exactly similar to the strips 15 forming the lower portion of the batch feeder, said strips 24 forming extensions of the strips 19 of the spout and also the rear terminal of the portion 15 engaged by the support 13. A pair of bands 25 are carried by these strips through the rivets 26, said bands being provided with the ears 27 at one terminal thereof which span the lug 28 formed at one terminal of the band 16, thus forming a hinge between the bands 25 and 16. The opposite terminal of the band 16 is provided with the hinged catches 28 which engage the slotted lugs 29 of the bands 25, thus supplying a means whereby the hinged section 24 may be rigidly clamped against the section 15. Both the sections 15 and 24 are provided adjacent the supporting member 13′ with the semi-circular band 30 which is riveted to each of the strips 15′ and 24′ and further supplies a secure means of clamping said strips together. In order to provide a means whereby this batch feeder may be rotated in the supporting members 13 and 13′ substantially two-thirds of a revolution, a stud 31 is mounted on the plate 23 of the batch feeder and is provided with the reduced portion 32 at its outer terminal. A bracket 33 is mounted on the bed plate 10 adjacent to the bracket 12 and is provided at its upper terminal with the bearing 34 in which is journaled a shaft carrying the worm gear 35. This worm gear is connected to the reduced portion 32 of the stud 31 by the link 36 connected eccentrically to said worm gear. In order to provide a means whereby the worm gear may be rotated a driving shaft 37 is mounted in the bearings 38 carried by the bed plate and is provided at its inner terminals with the worm 39 which coöperates with the worm gear 35 rotating the same thereby oscillating the batch feeder through two-thirds of a revolution. At the outer terminal of the shaft 37 is provided a large pulley 40 which is connected by a belt to the motor or other driving power, while a small pulley 41 is provided between the large pulley 40 and the table B, said last named pulley supplying a means whereby the reducing rollers D hereinafter more fully described, may be operated.

Referring to Figs. 4, 5, 6, 7, and 8, which set forth the details of the reducing rollers D, 42 indicates in general a base plate provided at various intervals with a series of brackets, said brackets providing for the mounting of the train of gears which operate the rollers. At the extremity thereof adjacent to the spout of the batch feeder and to the under side of the base plate 42 are a pair of bearings 43 in which is rotatably mounted the shaft 44, said shaft being provided at its outer terminal with the large pulley 45, and a small pulley 46, said small pulley 46 being connected to the small pulley 41 of the batch feeder by the belt 47, the large pulley providing a means whereby the twisting rollers may be operated. On the opposite side of the base plate 42 to the pulleys 45 and 46 are the vertical brackets 48, 48$^a$, 48$^b$, 48$^c$, and 48$^d$, the distance between said brackets gradually diminishing the farther the same are located from the pulleys. These brackets 48, 48$^a$, etc. are provided with double bearings, one superposed above the other in order that the terminals of the shafts 50 of the double train of rollers may be journaled therein. Opposite to the bracket 48 and superposed above the shaft 44 is a bracket 49, said bracket being provided with a bearing 51 on its upper edge and a centrally disposed shoulder 52, said shoulder having a groove therein for the reception of the shaft 50 of the lower roller. A small gear 53 is mounted on the shaft 44 adjacent to the small pulley 46 and meshes with a large gear 54 carried on the shaft 50 of the first roller, said shaft being provided with a small gear 55 between the gear 54 and the bracket 49 which meshes with a gear 56 carried by the shaft 50 of the upper roller. Thus it will be seen that the first rollers are operated directly from the pulley shaft; the remaining rollers of the set being operated by a train of constantly diminishing gears driven from the gear 54, an idle gear 57 being interposed between each pair of gears carried by the shafts 50 of the lower rollers, thus providing a means whereby the rollers may be rotated in the same direction. The brackets 49$^a$ and 49$^b$ carrying the gears and the extreme rollers are exact counter-parts of the bracket 49, the only difference being that the brackets 49$^a$ and 49$^b$ are double in lieu of the single bracket 49, the bearings of the brackets 49$^a$ and 49$^b$ registering with the bearings of the brackets 48$^a$, 48$^b$, 48$^c$, and 48$^d$. The upper rollers are operated from the lower rollers by the gears 58 carried by the shafts 50 of the upper rollers, meshing with driving gears carried on the shaft 50 of the lower rollers between the driven gears and the brackets 49$^a$ and 49$^d$. The rollers 59 which are mounted on the shafts 50 are provided with a centrally reduced portion 60, said reduced portion being provided with a central grooved section 61, said section being spaced at each end from the ends of the rollers 59 forming a mounting for the guiding plates 62. These guiding plates are rectangular in form and provided with the centrally disposed depression 63 in the upper and lower edges thereof, said depressions adapted to be received in the grooves formed between the section 61 and the shoulder of the rollers 59. These plates are curved outwardly at their terminals, said plates converging from the rear of the machine to the front. From this construction it will be readily seen that as the candy is delivered from the batch feeder C to the chute 64 between the said batch feeder and reducing rollers D, it will be engaged by a grooved section 61 of the first pair of rollers and will then be passed through the remaining rollers and as the grooves of said section 61 of the rollers become smaller and the guiding plates 62 converge the candy will be gradually reduced to the diameter of the curve of the groove in the last rollers. The rollers may be changed when it is so desired in order that different rollers may be placed on the shafts 50 to form stick candy of various shapes. Likewise the rollers may be replaced by rollers having the groove in the sections 61 larger or smaller in proportion to the number of sticks of candy to the pound.

On Figs. 9, 10, and 11 are illustrated various details of the twisting rollers E. A bearing 64 is mounted on each end of substantially the remaining plates of the table not taken up by the reducing rollers D. Between these brackets are journaled the twisting rollers 65, said twisting rollers being constructed of wood and carry at their terminals the plates 66 on which is formed the stud 67, said stud forming the journal for the rollers. The studs at the rear terminals of the rollers carry the gears 68, said gears meshing with a spur gear 69 carried by the shaft 70. This shaft is journaled in a bearing 71 disposed to the rear of the twisting rollers and carries at its rear terminal the bevel gear 72. A driving shaft 73 is mounted in the bearings 74 and carries at its outer terminal the large pulley 75, the intermediate small pulley 76, and the inner small pulley 77. The intermediate pulley 76 is connected by the belt 48 to the large pulley 45, thus driving the shaft 73 and operating the mechanisms. A bevel gear 78 is carried at the inner terminal of the shaft 73 and meshes with the bevel gear 72, thus constantly rotating the same and as a result the operating and twisting rollers in like directions. In order that the candy may be retained in constant engagement with the twisting rollers a pair of upwardly curved brackets 79 are mounted on the bearings 64 and have the shafts 80 journaled in the upper extremity thereof, said shafts carrying between the brackets 79 the rollers 81, said rollers being reduced at each extremity and provided with the central straight portion 82 which is adapted to constantly bear against the candy. The rear shaft 80 is provided at each extremity with the pulleys 83, one of said pulleys being driven by the belt 84 passing over the extreme small pulley 77 of the shaft 73 while the pulley at the opposite terminal of the shaft 80 is provided with a belt 85 passing over a pulley 86 carried by the opposite shaft 80, thus constantly rotating the rollers in a similar direction and not only aiding in passing the candy through the twisting mechanism but retaining the same in engagement with the twisting rollers. An air pipe 87 is superposed above the twisting rollers 65 and is provided with the downward extensions 88, said brackets connecting to the tube 89 which is located directly over said feeding rollers. Thus it will be seen that the candy is cooled to the proper consistency as it passes over the twisting rollers.

The cutting mechanism comprises a pair of supports 90 mounted on the extreme end of the table A, said supports being forked and admit the shaft 91 passing therethrough and are provided at their upper extremities with the guides 92. The shaft 91 is mounted in the bearings 93 and is provided at one terminal with the pulley wheel 94 which is operated by the belt 95 extending from the large pulley 75. A plate 96 extends over the guides 92 to brace the same and also provides a bearing for the spring 97 hereinafter described. A collar 98 carrying a plurality of notched cams 99 is slidably mounted on the shaft 91 between the bearings 93, said collar being provided with a set screw 100 which is adapted to retain the same so that any one of the cams 99 may operate below the guides 90. These cams are of various sizes and are so constructed that they operate the knife in such a manner that the candy of various lengths may be produced. A slide 101 is provided between the guides 92, said slide being provided with the extensions 102 which span said guides and insure the proper operation of the slide. This slide is provided with a transverse arm 103 which removably carries the knife 104. The lower terminal of the slide is provided with a projection 105 which engages the cam. Consequently as the cams are rotated the slide will be operated vertically. The spring 97 is interposed between said plate 96 and the upper extremity of the slide 101 and is adapted to normally project the slide downwardly. Consequently it will be understood that the cams 99 raise the slide against the action of the spring 97, thereby causing the slide to be forced downwardly by said spring when the projection of the cam releases the projection 105. A bracket 106 spans the guides 92 and is removably secured thereto, said bracket being provided with a grooved plate 107 to which is detachably connected the chute 108. From this construction it will be seen that the candy is plated in the batch feeder in a plastic mass and is delivered by the cutter G as a finished product, the entire operation being performed without the necessity of removing the candy from the machine or in any way touching it or handling it. Furthermore, the various elements of the machine receive the candy from the preceding element and are driven from the batch feeder in such a manner that they operate in the proper ratio of speed.

The pipes 88 are provided with the valves 109 in order that the flow of the cooling air may be regulated.

A heater G is disposed below the batch feeder in order that the candy may be retained in any temperature as desired.

The reducing rollers 59 may also be said to be feeding or drawing rollers for feeding the candy to the twisting rollers 65, simultaneously drawing out the candy to obtain the desired diameter of the stick. The rollers 82 constitute pressure rollers or devices for holding the candy in intimate contact with the twisting rollers as the latter operate thereon in performing their twisting function. The twisting rollers 65 are arranged longitudinally of the machine while the feeding or drawing rollers are disposed transverse to the machine, or in other words, the twisting rollers operate about axes transverse or substantially at right angles to the axes of the feeding or drawing rollers. The twisting rollers furthermore are arranged substantially parallel with the stick of candy when the latter has been shaped and is fed to said twisting rollers.

Having thus described our invention, what is claimed as new is:

1. In a candy machine, the combination with a platform, of an oscillatory batch feeder mounted thereon, means for oscillating said batch feeder, a heater disposed under said batch feeder, reducing rollers adapted to receive the products from said batch feeder and be driven directly from said main driving means, and twisting rollers adapted to receive the candy directly from said reducing rollers, and be driven at an increased speed over the speed of the last reducing roller, comprising in combination with a frame, of longitudinally extending rollers mounted thereon, means for rotating said rollers in opposite directions, and means located at each terminal of said rollers whereby the product may be retained in contact therewith.

2. In a candy machine, the combination with a platform, of an oscillatory batch feeder mounted thereon, means for oscillating said batch feeder, a heater disposed under said batch feeder, reducing rollers adapted to receive the product from said batch feeder and be driven directly from said main driving means, and twisting rollers adapted to receive the candy directly from said reducing rollers, and be driven at an increased speed over the speed of the last reducing roller, comprising in combination with a plurality of bearings, of a plurality of longitudinally extending rollers interposed between said bearings, a stub shaft extending in the same direction as said rollers and located adjacent to one terminal thereof, a worm gear located on said stub shaft, a driving shaft adapted to rotate said worm, and gears carried at the terminals of said rollers, a gear carried at the terminal of said stub shaft adapted to rotate said gear in opposite direction and transverse retaining rollers superposed above said twisting rollers, and means whereby said driving shaft may be driven directly from said reducing rollers, and at an increased speed over the speed of the initial reducing roller.

3. In a candy machine, the combination with a platform, of an oscillatory batch feeder mounted thereon, means for oscillating said batch feeder, a heater disposed under said batch feeder, reducing rollers adapted to receive the product from said batch feeder and be driven directly from said main driving means, twisting rollers adapted to receive the candy directly from said reducing rollers and be driven at an increased speed over the speed of the last reducing roller, and a cooling machanism disposed above said twisting rollers adapted to cool the product passing over said twisting rollers throughout its entire length.

4. In a candy machine, the combination with a platform, of an oscillatory batch feeder mounted thereon, means for oscillating said batch feeder, a heater disposed under said batch feeder, reducing rollers adapted to receive the product from said batch feeder and be driven directly from said main driving means, twisting rollers adapted to receive the candy directly from said reducing rollers and be driven at an increased speed over the speed of the last reducing roller, and a cooling mechanism disposed above said twisting rollers adapted to cool the product passing over said twisting rollers throughout its entire length, comprising in combination with an air supply pipe, of a series of downwardly extending pipes carried thereby, and a longitudinal pipe carried by said downwardly extending pipes having a series of bifurcations therein on the under side, said last named pipe adapted to cool the product passing over the twisting rollers throughout its entire length.

5. In a candy machine, the combination of a plurality of feeding rollers adapted to receive and shape the candy into stick form, a plurality of twisting rollers rotatable about fixed axes and arranged to receive the candy from the feeding rollers, means for operating the twisting rollers while a portion of the candy is held by the feeding rollers, and pressure devices arranged to hold the candy in intimate contact with the twisting rollers.

6. In a candy machine, the combination of a plurality of feeding rollers adapted to receive and shape the candy into stick form, a plurality of twisting rollers rotatable about fixed axes and arranged to receive the candy from the feeding rollers, means for operating the twisting rollers while a portion of the candy is held by the feeding rollers, and pressure rollers arranged above the twisting rollers and operable about axes transverse to those of the twisting rollers.

7. In a candy machine, the combination of a plurality of feeding rollers adapted to receive the candy and shape the same into stick form, twisting rollers arranged to operate upon the candy while a portion thereof is held by feeding rollers, and pressure means comprising rollers operable about axes at a right angle to the axes of the twisting rollers, and holding the candy in intimate contact with the surfaces of the twisting rollers as the latter rotate.

8. In a candy machine, the combination of a pair of spaced elongated twisting rollers, means for shaping the candy into stick form, and feeding the same between the elongated surfaces of the twisting rollers, and pressure rollers operable about axes at a right angle to the axes of the twisting rollers, and arranged to hold the candy in intimate contact with the latter.

9. In a candy machine, the combination of feeding means for shaping the candy into stick form, twisting rollers adapted to receive the candy while held by the feeding means and arranged parallel with the axis of the candy stick when formed, and means for holding the candy in intimate contact with the twisting rollers as the latter operate thereon.

10. In a candy machine, the combination of feeding means for shaping the candy into stick form, twisting rollers adapted to receive the candy while held by the feeding means and arranged parallel with the axis of the candy stick when formed, and pressure rollers arranged transversely with respect to the twisting rollers and adapted to hold the candy in intimate contact with the latter while operating thereon.

11. A candy machine, comprising in combination, a feeder, reducing rollers coöperating with said feeder, twisting rollers coöperating with said reducing rollers, and a cooling apparatus disposed above said twisting rollers and operating throughout the entire length thereof.

In testimony whereof we have affixed our signatures in presence of two witnesses.

FREDRICK W. LOVELADY.
BERNARD J. KENNEDY.

Witnesses:
VICTOR E. SCHWAHN,
FRED T. HELFRESHT.